United States Patent
Hara

(10) Patent No.: US 9,441,958 B2
(45) Date of Patent: Sep. 13, 2016

(54) DEVICE, METHOD, AND NON-TRANSITORY COMPUTER-READABLE RECORDING MEDIUM TO CALCULATE A PARAMETER FOR CALIBRATION

(71) Applicant: Takayuki Hara, Kanagawa (JP)

(72) Inventor: Takayuki Hara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 89 days.

(21) Appl. No.: 14/456,075

(22) Filed: Aug. 11, 2014

(65) Prior Publication Data

US 2015/0043827 A1 Feb. 12, 2015

(30) Foreign Application Priority Data

Aug. 12, 2013 (JP) .................................. 2013-167588

(51) Int. Cl.

| | | |
|---|---|---|
| *G06K 9/52* | (2006.01) | |
| *G01B 11/25* | (2006.01) | |
| *G06K 9/20* | (2006.01) | |
| *G06T 7/00* | (2006.01) | |

(52) U.S. Cl.
CPC ......... *G01B 11/2504* (2013.01); *G06K 9/2036* (2013.01); *G06T 7/0018* (2013.01)

(58) Field of Classification Search
None
See application file for complete search history.

(56) References Cited

U.S. PATENT DOCUMENTS

| | | | |
|---|---|---|---|
| 7,724,379 B2 | 5/2010 | Kawasaki et al. | |
| 2005/0207640 A1* | 9/2005 | Kim | G06T 7/0018 |
| | | | 382/154 |
| 2010/0222684 A1* | 9/2010 | Hatzilias | G01B 11/25 |
| | | | 600/476 |
| 2015/0317780 A1* | 11/2015 | Dumont | G01C 11/06 |
| | | | 348/47 |

FOREIGN PATENT DOCUMENTS

| | | |
|---|---|---|
| JP | 06-120759 | 4/1994 |
| JP | 2001-320652 | 11/2001 |
| JP | 2005-326247 | 11/2005 |
| JP | 4230525 | 2/2009 |
| JP | 2011-242183 | 12/2011 |
| JP | 2012-078858 | 4/2012 |
| JP | 4986679 | 7/2012 |
| WO | WO 2008/120457 A1 | 10/2008 |
| WO | WO 2011/145285 A1 | 11/2011 |

OTHER PUBLICATIONS

U.S. Appl. No. 14/208,669, filed Mar. 13, 2014.

* cited by examiner

*Primary Examiner* — David F Dunphy
(74) *Attorney, Agent, or Firm* — Oblon, McClelland, Maier & Neustadt, L.L.P

(57) ABSTRACT

A device includes a characteristic point extraction part configured to extract, as a characteristic point, a pattern projected on an object from an imaging image obtained by imaging the pattern projected on the object, and a parameter calculation part configured to calculate a parameter configured to minimize a distance between the characteristic point on an imaging image plane and a line obtained by projecting a projection light ray corresponding to the characteristic point onto the imaging image plane.

11 Claims, 11 Drawing Sheets

IMAGING IMAGE PLANE $e_p^{(i)}$ DIRECTIONAL VECTOR $p_p^{(i)}$ PASSAGE POSITION

M(i)

200 PROJECTION DEVICE (NON-PINHOLE)

$x_p^{(i)}$ $x_p$ $y_p^{(i)}$ i-TH CORRESPONDING POINT $y_p$ PROJECTION IMAGE PLANE

DEVICE, METHOD, AND NON-TRANSITORY COMPUTER-READABLE RECORDING MEDIUM TO CALCULATE A PARAMETER FOR CALIBRATION

BACKGROUND OF THE INVENTION

1. Field of the Invention

An aspect of the present invention relates to at least one of a device, a method, and a non-transitory computer-readable recording medium.

2. Description of the Related Art

Conventionally, a technique has been known for imaging, from different viewpoints, an object to be measured on which light with a predetermined pattern has been projected, to measure a three-dimensional shape of such an object to be measured.

Such a three-dimensional measurement is such that a correspondence between a projected pattern and an imaged pattern is executed and subsequently a distance to an object to be measured is calculated in accordance with a principle of triangulation. For such a calculation, an internal parameter (such as a focal length, a position of an optical axis, or a lens distortion) and an outer parameter (such as a relative position/attitude between a projection device and an imaging device) of an optical system for any of a projection device and an imaging device are needed.

Acquiring a parameter as described above preliminarily is referred to as calibration. For a method of this calibration, there are a method for preliminarily executing calibration by using a dedicated calibration object that has a known shape, and a method for simultaneously executing calibration at a time of measurement by using an object to be measured, per se, (self-calibration method). According to this self-calibration method, a preliminary calibration operation that uses a dedicated calibration object is not required and there is an advantage of being able to deal with a secular change of a system flexibly, so that a variety of studies have been conducted in recent years.

For such a self-calibration method, Japanese Patent Application Publication No. 2005-326247 discloses a method that extracts a plurality of planar areas from an object to be measured, subsequently derives a plane projection matrix H between a projection image and an imaging image based on 4 or more corresponding points on each plane, and obtains a parameter as a solution of a linear programming problem based on a plurality of derived plane projection matrices $H_1$, $H_2$, ... $H_n$. However, it is not possible to apply a method in Japanese Patent Application Publication No. 2005-326247 to a case where an object to be measured does not have a planar area (for example, a case where an object to be measured is composed of a curved surface).

In this respect, Japanese Patent No. 4230525 discloses a method that defines an error function in such a manner that a distance in a three-dimensional space between a line of sight that is directed from a projector to a projection point on an object to be measured (a first straight line) and a line of sight that is directed from a camera to such a projection point (a second straight line) is a minimum in a case where the camera and the projector satisfy an epipolar constraint with respect to such a projection point and further estimates a parameter for minimizing such an error function in accordance with a non-linear programming method.

However, a self-calibration method disclosed in Japanese Patent No. 4230525 uses an error function that presupposes an epipolar constraint, and hence, there is a problem that it is not possible to be applied to a case where an optical system of a projector or a camera deviates from a pinhole model (for example, a case where a short focus projector or an omnidirectional camera is used).

SUMMARY OF THE INVENTION

According to one aspect of the present invention, there is provided a device including a characteristic point extraction part configured to extract, as a characteristic point, a pattern projected on an object from an imaging image obtained by imaging the pattern projected on the object, and a parameter calculation part configured to calculate a parameter configured to minimize a distance between the characteristic point on an imaging image plane and a line obtained by projecting a projection light ray corresponding to the characteristic point onto the imaging image plane.

According to another aspect of the present invention, there is provided a method including extracting, as a characteristic point, a pattern projected on an object from an imaging image obtained by imaging the pattern projected on the object, and calculating a parameter configured to minimize a distance between the characteristic point on an imaging image plane and a line obtained by projecting a projection light ray corresponding to the characteristic point onto the imaging image plane.

According to another aspect of the present invention, there is provided a non-transitory computer-readable recording medium, including a program recorded therein, the program being configured to cause a computer to execute a method including extracting, as a characteristic point, a pattern projected on an object from an imaging image obtained by imaging the pattern projected on the object, and calculating a parameter configured to minimize a distance between the characteristic point on an imaging image plane and a line obtained by projecting a projection light ray corresponding to the characteristic point onto the imaging image plane.

DETAILED DESCRIPTION OF THE PREFERRED EMBODIMENTS

Although an embodiment of the present invention will be described below, the present invention is not limited to an embodiment as described below. Here, in the figures that will be referred to below, identical numeral references will be used for a common element and a duplicate description thereof will be omitted appropriately.

Figure 1:
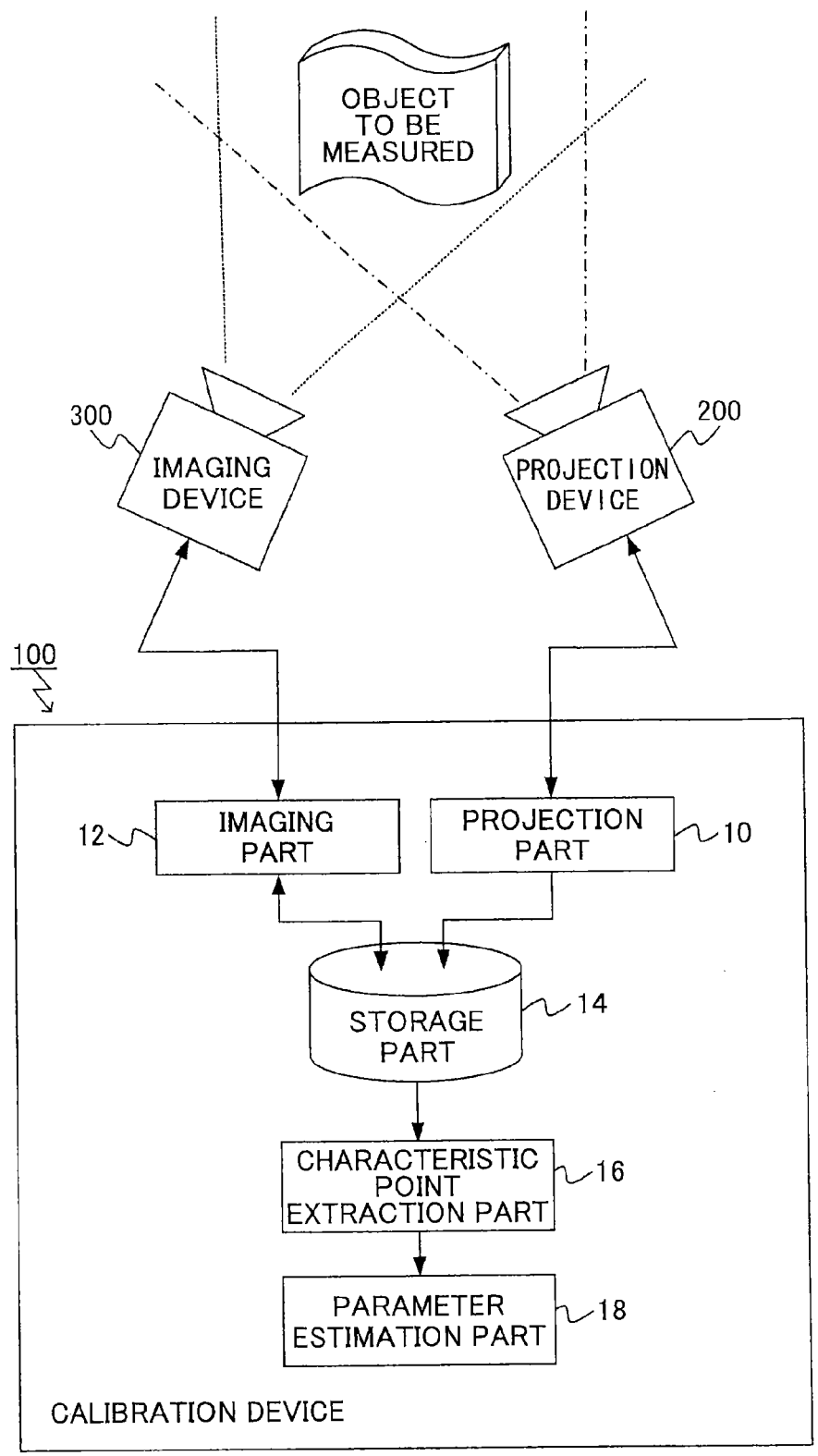
FIG. 1 is a functional block diagram of a calibration device in the present embodiment.

FIG. 1 illustrates a functional block diagram of a calibration device 100 that is an embodiment of the present invention. The calibration device 100 in the present embodiment is an information processing device that is connected to both a projection device 200 and an imaging device 300 so as to be able to communicate therewith and is configured to include a projection part 10, an imaging part 12, a storage part 14, a characteristic point extraction part 16, and a parameter estimation part 18. Herein, it is possible for the imaging device 300 to be referred to as a digital camera with an imaging element such as a CCD or a CMOS and it is possible for the projection device 200 to be referred to as a projector.

The projection part 10 is a functional part for reading a predetermined pattern for calibration from the storage part 14 and controlling the projection device 200 to project such a pattern for calibration onto an object to be measured.

The imaging part 12 is a functional part for controlling the imaging device 300 to image an object to be measured and storing an acquired imaging image in the storage part 14.

The characteristic point extraction part 16 is a functional part for reading, from the storage part 14, an imaging image that has been imaged by the imaging device 300, and extracting a characteristic point of a pattern projected from such an imaging image onto an object to be measured.

The parameter estimation part 18 is a functional part for estimating a parameter necessary for a three-dimensional measurement based on a plurality of characteristic points extracted by the characteristic point extraction part 16. Herein, for a parameter necessary for a three-dimensional measurement, it is possible to provide an internal parameter L of the projection device 200, an internal parameter K of the imaging device 300, or a rotation matrix R and a translation vector t between a projection coordinate system and an imaging coordinate system, as well as a distortion of a lens of the projection device 200 or the imaging device 300, or the like.

Figure 2A:
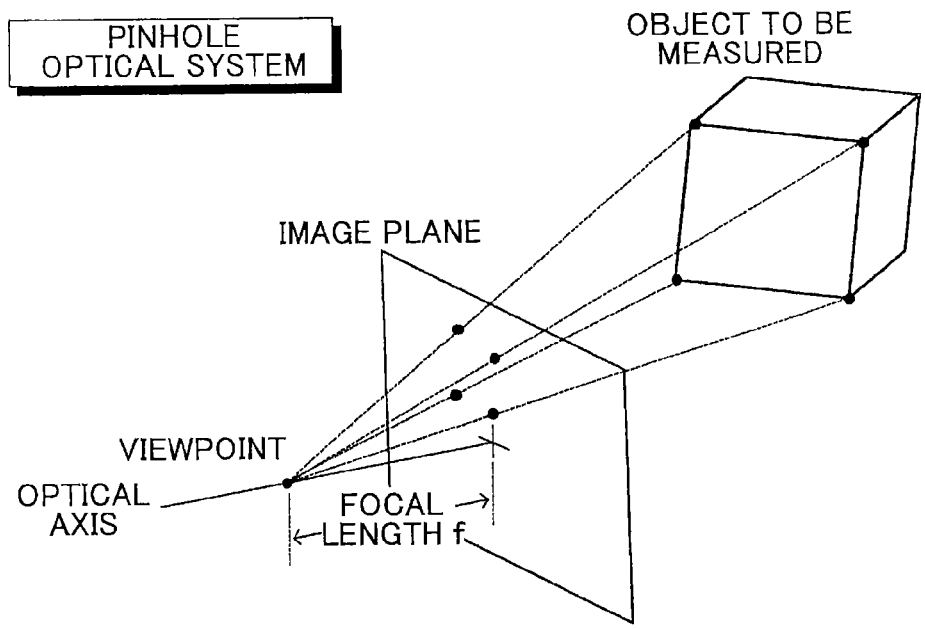
FIG. 2A and FIG. 2B are diagrams of a pinhole camera optical system and a non-pinhole camera optical system.
Figure 2B:
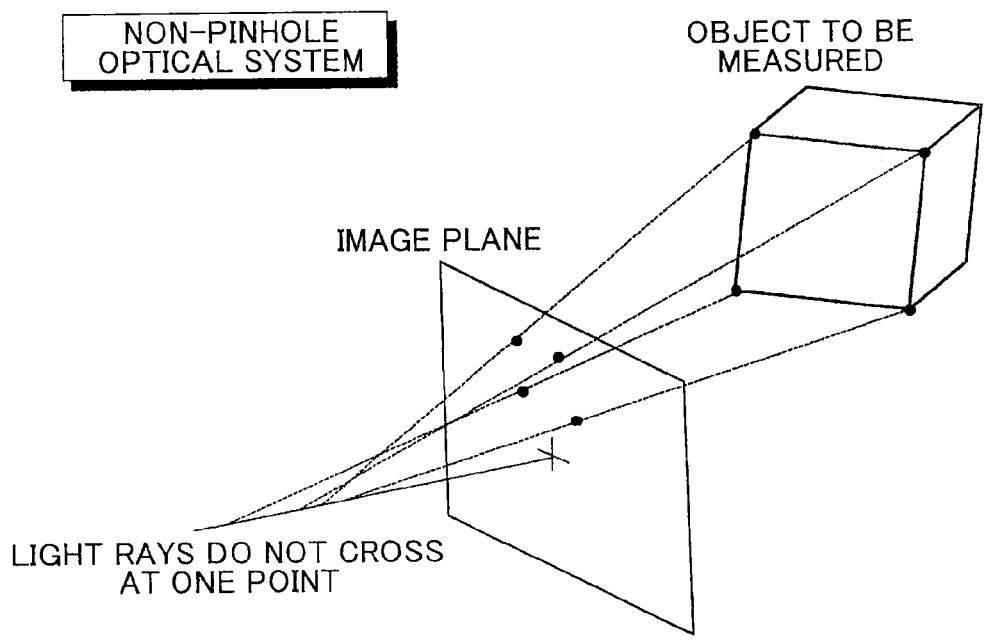

FIG. 2A illustrates an optical system of a pinhole camera model (that will be referred to as a "pinhole optical system" below) wherein all of light rays pass through one viewpoint and FIG. 2B illustrates an optical system deviating from a pinhole camera model (that will be referred to as a "non-pinhole optical system" below) wherein not all of light rays cross at one point. It is possible to apply to a self-calibration method in the present embodiment to even a case where an optical device(s) to be used (the projection device 200 and/or the imaging device 300) adopt(s) any of a pinhole optical system and a non-pinhole optical system.

Figure 3:
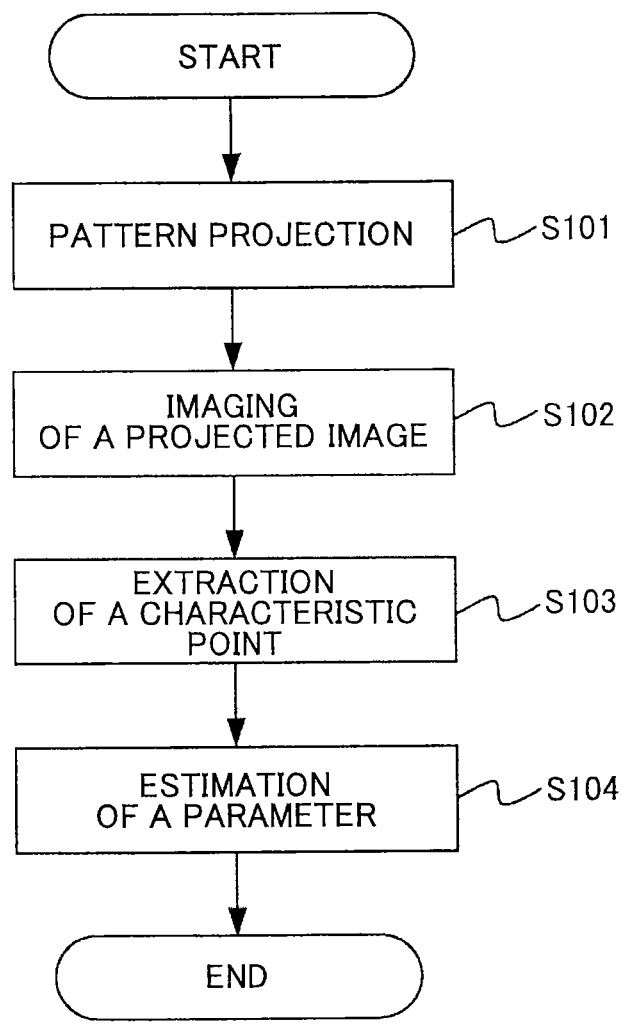
FIG. 3 is a flowchart for a process to be executed by a calibration device in the present embodiment.

While each functional part that constitutes the calibration device 100 in the present embodiment has generally been described above, content of a process to be cooperatively executed by each functional part as described above will be continuously described based on a flowchart illustrated in FIG. 3. Here, FIG. 1 will be appropriately referred to in the following description.

Figure 4:
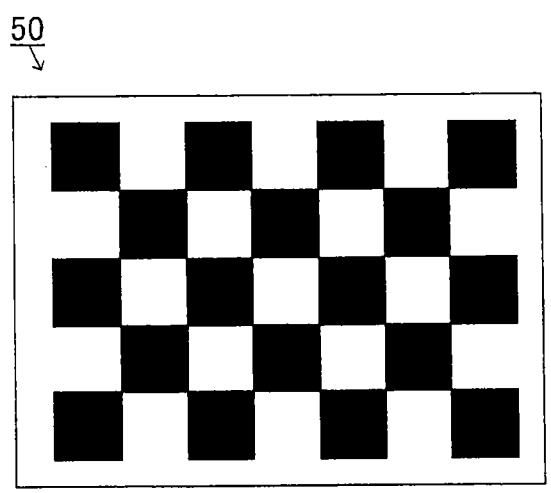
FIG. 4 is a diagram illustrating a checker pattern as a pattern for calibration.

Prior to calibration, a relative position and/or attitude between the projection device 200 and the imaging device 300 is first fixed. Subsequently, at step 101, the projection part 10 reads a pattern for calibration from the storage part 14 and controls the projection device 200 to project such a pattern for calibration onto an object to be measured. A pattern for calibration may be any pattern as long as it is possible to extract a characteristic point therefrom, wherein a description of a case where a pattern for calibration is a checker pattern 50 illustrated in FIG. 4 will be provided below.

At subsequent step 102, the imaging part 12 controls the imaging device 300 to image an object to be measured. At this time, the imaging part 12 acquires an imaging image of an object to be measured wherein the checker pattern 50 has been projected thereon, and stores such an imaging image in the storage part 14.

At subsequent step 103, the characteristic point extraction part 16 reads, and executes an image analysis of, an imaging image stored in the storage part 14, and thereby, extracts a characteristic point from the imaging image. Specifically, a corner (a characteristic point) of a square (white or black) portion of the checker pattern 50 projected on an object to be measured is detected from an imaging image by using a Harris's corner detection method or the like, and a position of such a characteristic point (two-dimensional coordinates) on an imaging image plane is acquired.

At subsequent step 104, the parameter estimation part 18 estimates at least one of the above-mentioned parameters (L, K, R, t, and the like) necessary for a three-dimensional measurement based on a plurality of characteristic points acquired at step 103. Content of an estimation process to be executed at step 104 will be described below.

Figure 5:
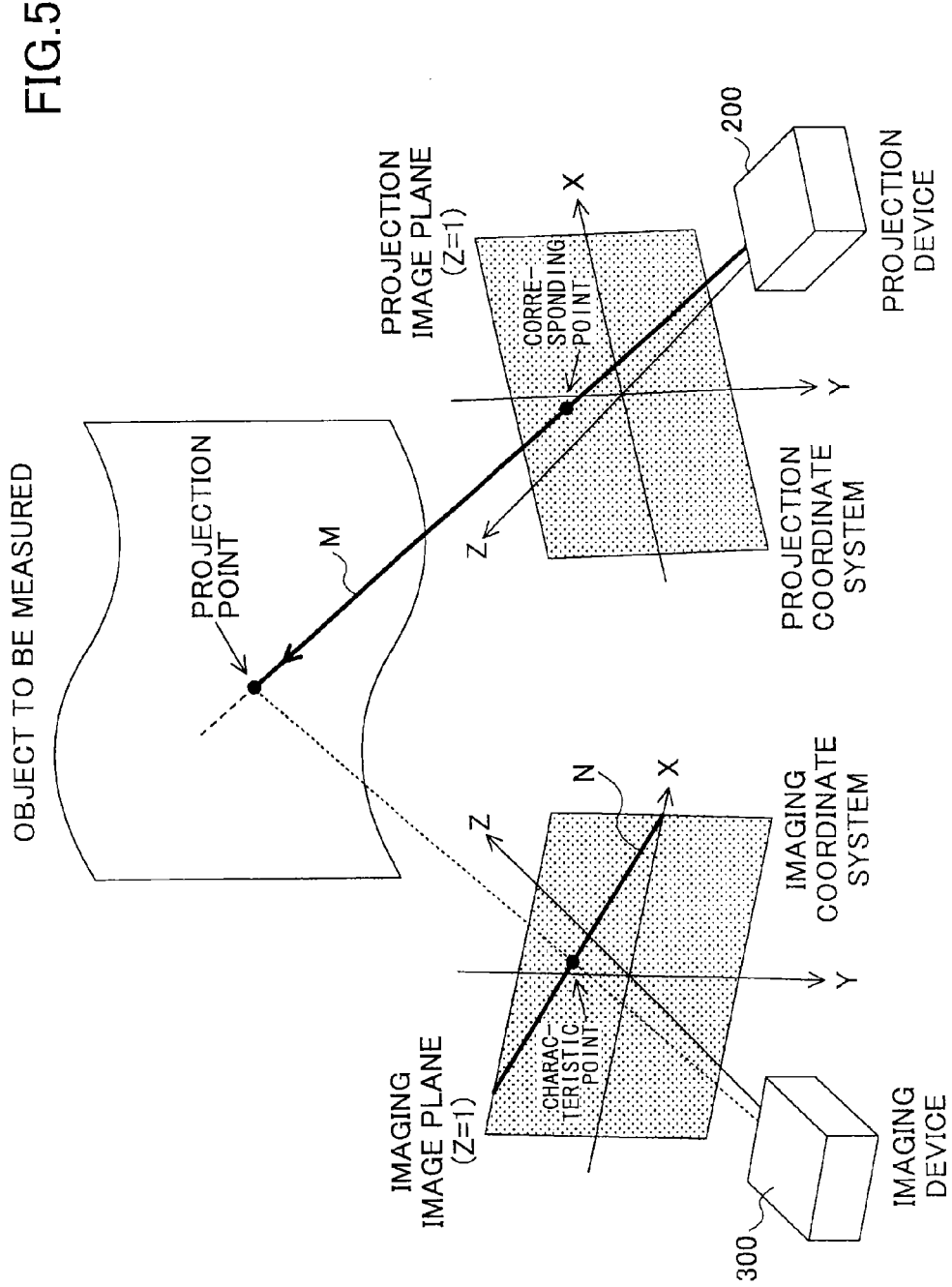
FIG. 5 is a conceptual diagram for illustrating an evaluation function in the present embodiment.

At step 104, the parameter estimation part 18 obtains a formula of a straight line N provided by projecting onto an imaging image plane, a projection light ray M that passes through a projection point on an object to be measured that corresponds to a characteristic point on the imaging image plane that is extracted at previous step 103, as illustrated in FIG. 5. As a result, at step 104, lines $N_1$, $N_2$, $N_3$, ... $N_n$, are obtained for a plurality of characteristic points 1, 2, 3, ... n extracted at step 103, respectively.

Figure 6:
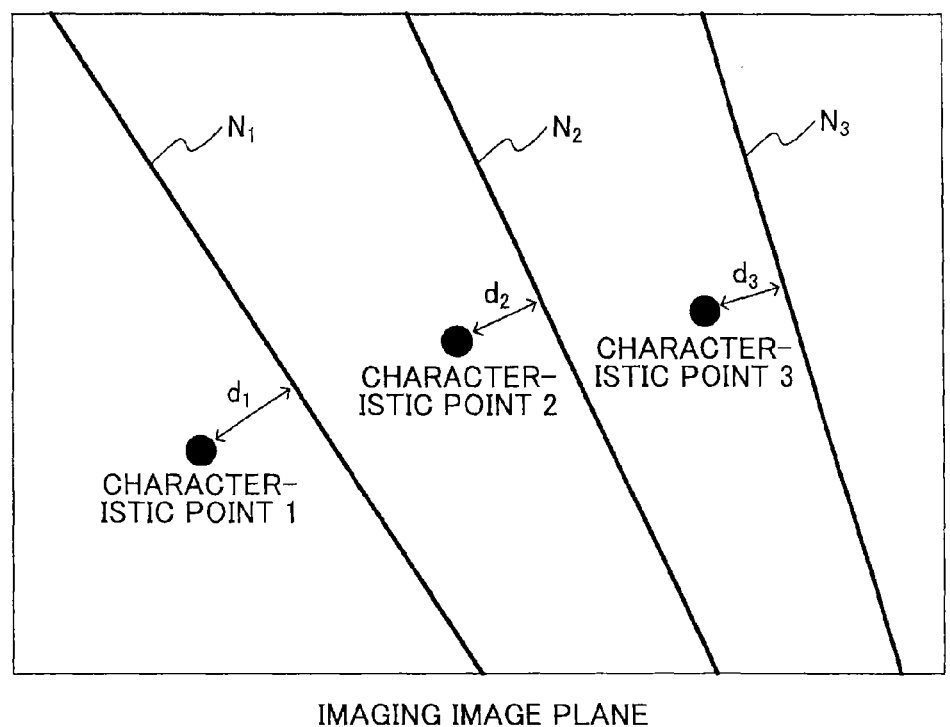
FIG. 6 is a conceptual diagram for illustrating an evaluation function in the present embodiment.

Herein, a distance between each characteristic point and a corresponding straight line N is produced on an imaging image plane as illustrated in FIG. 6, due to a position extraction error for such a characteristic point. In this respect, the parameter estimation part 18 has an evaluation function for evaluating a Euclidian distance ($d_1$, $d_2$, $d_3$, ... , $d_n$) between a straight line N and a characteristic point, and estimates a parameter for minimizing an output value of such an evaluation function in accordance with a non-linear programming method.

That is, although a position extraction error for a characteristic point on an imaging image plane is a dominant error in many applications, it is possible for the present embodiment to provide calibration at high precision because a parameter is estimated in such a manner that a Euclidean distance between a straight line N and a characteristic point is minimized directly.

Here, if all of parameters are unknowns, an indetermination is provided so that values thereof are not uniquely determined without a change, and hence, optimization is executed by reducing parameters to be estimated, providing an evaluation function with a regularization term, or the like. For such optimization, it is possible to use an algorithm for a non-linear programming method, such as a method of steepest descent, a Newton's method, or a conjugate gradient method.

Although a summary of an estimation process to be executed at step 104 has been described above, a process to be executed at step 104 is such that content thereof is different between a case where an optical device (the projection device 200 and the imaging device 300) that is a pinhole optical system is used and a case where an optical device (the projection device 200 and the imaging device 300) that is a non-pinhole optical system is used. This matter will be described step by step below. Here, FIG. 3 and FIG. 5 will be appropriately referred to in the following description.

<Case where Two Optical Devices are Both Pinhole Optical Systems>

Herein, a process to be executed by the parameter estimation part 18 will first be described in a case where optical systems of two optical devices (the projection device 200 and the imaging device 300) are both pinhole optical systems.

First, an evaluation function to be used by the parameter estimation part 18 will be described along with a derivation process thereof.

As position coordinates of an i-th correspondence point on a projection image plane that corresponds to an i-th characteristic point on an imaging image plane that has been extracted at step 103 are referred to as $(x_p^{(i)}, y_p^{(i)})$, a directional vector $e_p^{(i)}$ of a projection light ray $M^{(i)}$ that corresponds to the i-th correspondence point, in a projection coordinate system, is represented by formula (1) described below:

$$e_p^{(i)} = \begin{pmatrix} x_p^{(i)} \\ y_p^{(i)} \\ f_p \end{pmatrix} \quad (1)$$

by using a focal length $f_p$ of the projection device 200.

Herein, in a case where an internal parameter matrix L of the projection device 200 is represented by formula (2) described below:

$$L = \begin{pmatrix} l_{11} & l_{12} & l_{13} \\ l_{21} & l_{22} & l_{23} \\ l_{31} & l_{32} & l_{33} \end{pmatrix} \quad (2)$$

a directional vector $e_p^{(i)}$ is represented by formula (3) described below:

$$e_p^{(i)} = \begin{pmatrix} x_p^{(i)} l_{31} - l_{11} \\ x_p^{(i)} l_{32} - l_{12} \\ x_p^{(i)} l_{33} - l_{13} \end{pmatrix} \times \begin{pmatrix} y_p^{(i)} l_{31} - l_{21} \\ y_p^{(i)} l_{32} - l_{22} \\ y_p^{(i)} l_{33} - l_{23} \end{pmatrix} \quad (3)$$

Here, "×" in formula (3) described above denotes a vector product.

Then, a projection light ray $M^{(i)}$ in an imaging coordinate system is represented by formula (4) described below:

$$Re_p^{(i)}s + t \quad (4)$$

by using a directional vector $e_p^{(i)}$, a rotation matrix R, a translation vector t, and a parameter s.

Then, as two-dimensional coordinates on an imaging image plane are referred to as $(x_C, y_C)$, a straight line $N^{(i)}$ provided by projecting a straight line represented by formula (4) described above onto an imaging image plane is represented by formula (5) described below:

$$\begin{pmatrix} x_c \\ y_c \\ 1 \end{pmatrix} \cong K(Re_p^{(i)}s + t) \quad (5)$$

by using a directional vector $e_p^{(i)}$, a rotation matrix R, a translation vector t, an internal parameter matrix K of the imaging device, and a parameter s.

A locus of $(x_c, y_c)$ in a case where a value of a parameter s in formula (5) described above is changed is a straight line $N^{(i)}$. Formula (5) described above represents a left side being a scalar multiple of a right side, and as an indetermination of a scalar multiple and a parameter s are eliminated from formula (5) described above, formula (5) described above is summarized as formula (6) described below:

$$(KRe_p^{(i)} \times Kt)^T \begin{pmatrix} x_c \\ y_c \\ 1 \end{pmatrix} = 0 \quad (6)$$

Figure 7:
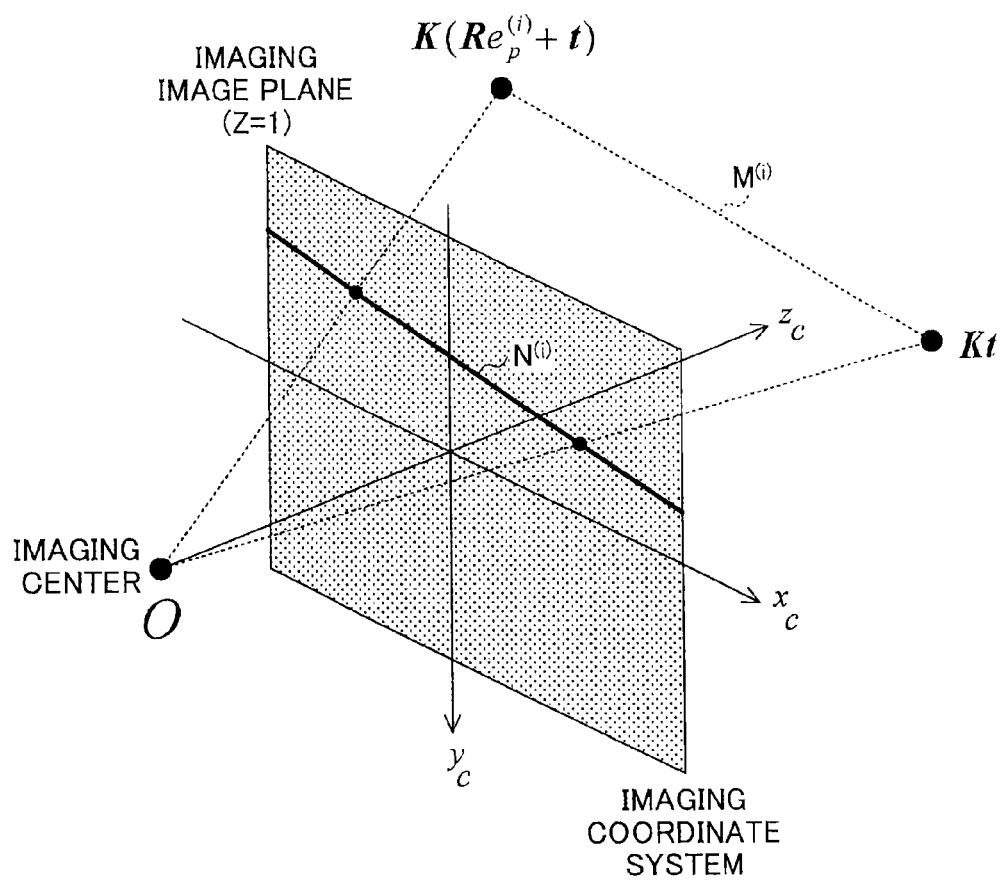
FIG. 7 is a conceptual diagram for illustrating an evaluation function in the present embodiment.

Herein, a concept of summarizing formula (5) described above as formula (6) described above will be described based on FIG. 7. In a case where an imaging center O of the imaging device 300 is an origin of an imaging coordinate system, a plane of z=1 is an imaging image plane. Then, a right side of formula (5) described above is "Kt" in a case of s=0 or "K(Re$_p^{(i)}$+t)" in a case of s=1, and a line on which an imaging image plane (z=1) intersects with a plane that passes through three points that are these two points and an imaging center O is a straight line N(i) to be obtained.

Herein, it is possible to represent an equation of a plane by "$n^T x=0$" generally, in a case where a normal vector of such a plane is "n" and coordinates on such a plane are "x" (that is, a plane is represented by a set of points that are orthogonal to a direction of a normal line of such a plane).

Herein, because it is possible to represent a normal vector n of a plane that passes through three points that are "Kt", "K(Re$_p^{(i)}$+t)", and an imaging center O as a vector product of a vector that is directed from the imaging center O to "Kt" and a vector that is directed from the imaging center O to "K(Re$_p^{(i)}$+t)", such a normal vector n is represented by formula (7) described below:

$$\begin{aligned} n &= Kt \times K(Re_p^{(i)} + t) \\ &= Kt \times KRe_p^{(i)} + Kt \times Kt \\ &= Kt \times KRe_p^{(i)} \end{aligned} \quad (7)$$

Herein, where an imaging image plane is regarded as a set of points $(x_c, y_c, 1)$, formula (6) described above is derived as an equation of a straight line $N^{(i)}$ to be obtained wherein such a formula is such that a scalar product of a set of $(x_c, y_c, 1)$ and a normal vector n represented by formula (7) described above is 0.

Then, as a normal vector n represented by formula (7) described above is denoted by $c^{(i)}$, formula (8) described below:

$$c^{(i)} = \begin{pmatrix} c_1^{(i)} \\ c_2^{(i)} \\ c_3^{(i)} \end{pmatrix} = (KRe_p^{(i)} \times Kt) \quad (8)$$

is held.

In this case, it is possible to represent a Euclidean square distance $d_i^2$ between position coordinates $(x_c^{(i)}, y_c^{(i)})$ of an i-th characteristic point on an imaging image plane and a straight line $N^{(i)}$ on the imaging image plane as formula (9) described below:

$$d_i^2 = \frac{\left\{c^{(i)T}\begin{pmatrix} x_c^{(i)} \\ y_c^{(i)} \\ 1 \end{pmatrix}\right\}^2}{c_1^{(i)2} + v_2^{(i)2}} \quad (9)$$

Then, a sum of Euclidean square distances $d_i^2$ obtained for N characteristic points extracted by the characteristic point extraction part 16 is defined as an evaluation function J in the present embodiment. Formula (10) described below:

$$J = \sum_{i=1}^{N} d_i^2 \quad (10)$$

represents an evaluation function J.

In a case where a position extraction error for a characteristic point on an imaging image plane is provided in accordance with a Gaussian distribution, a parameter estimation based on minimization of an evaluation function J represented by formula (10) described above is a maximum likelihood estimation. Furthermore, if a position extraction error distribution is known, a maximum likelihood estimation is possible by reflecting a shape of such a distribution on an evaluation function, even in a case other than a Gaussian distribution.

An evaluation function to be used in a case where two optical devices are both pinhole optical systems has been described above, and then, an operation for estimating a parameter for minimizing an output value of an evaluation function J represented by formula (10) described above in accordance with a non-linear programming method will be described illustratively. Here, because a scale is not determined in a case where two optical devices are both pinhole optical systems, an actual measurement value or a design value is provided for a norm (scale) of t in any of the following cases.

(Case 1: a Case where R and t are Estimated)

In this case, L and K are preliminarily obtained by utilizing a conventional method for calibration of a pinhole camera. Then, remaining free variables of t (a three-dimensional vector) other than a norm thereof are referred to as t1 and t2. Specifically, it is possible to take a first element and a second element of t as t1 and t2, respectively, or provide deflection angles of t with respect to an x-axis and a y-axis as t1 and t2, respectively.

On the other hand, R is expressed by three variables that are rotation angles $\theta x$, $\theta y$, and $\theta z$ around x, y, and z-axes. As a result, in the present case, five variables of t1, t2, $\theta x$, $\theta y$, and $\theta z$ are targets for optimization and a value for minimizing an output value of an evaluation function J represented by formula (10) described above is obtained with respect to such five variables in accordance with a non-linear programming method. For example, a parameter is estimated by executing the following steps 1-4 in a case where a method of steepest descent is used.

Step 1: t1, t2, $\theta x$, $\theta y$, and $\theta z$ are set at initial values.

Step 2: A Gradient of an evaluation function J with respect to t1, t2, $\theta x$, $\theta y$, or $\theta z$ is calculated.

Step 3: A minimum point of an evaluation function J is obtained by executing a linear survey in a direction of a gradient to update t1, t2, $\theta x$, $\theta y$, or $\theta z$.

Step 4: Step 2→4 Step 3 is repeated until an amount of improvement of an evaluation function J is less than or equal to a threshold and a determination is made in such a manner that a solution is converged at a time when such an amount of improvement is less than or equal to a threshold, wherein a value at such a time is obtained as an estimation value.

(Case 2: a Case where Focal Lengths of L and K in Addition to R and t are Estimated)

Values of L and K other than focal lengths thereof are provided preliminarily. On that basis, where a focal length of the imaging device 300 is $f_c$ and a focal length of the projection device 200 is $f_p$, estimation values of seven variables of t1, t2, $\theta x$, $\theta y$, $\theta z$, $f_c$, and $f_p$ are obtained by an operation similar to that of Case 1. Here, it is also possible to execute an estimation while at least one of $f_c$ and $f_p$ is replaced with another arbitrary parameter (for example, a position of an optical axis).

(Case 3: a Case where all of R, t, L, and K are Estimated)

In a case where all of parameters are unknown, a regularization term is provided to an evaluation function J to execute optimization thereof. Herein, it is possible to set a regularization term at an amount of a deviation from a preliminary value, wherein, for example, in a case where preliminary values of parameters (R, t, L, K) are (R0, t0, L0, K0), it is possible to provide a regularization term represented by formula (11) described below:

$$\|R-R0\|^2 + \|t-t0\|^2 + \|L-L0\|^2 + \|K-K0\|^2 \quad (11)$$

to an evaluation function J. Here, in formula (11) described above, preliminary values (L0, K0) are preliminarily obtained by utilizing a conventional method for calibration of a pinhole camera, and preliminary values (R0, t0) are provided with actual measurement values or design values of a relative position/attitude between the imaging device 300 and the projection device 200.

A new evaluation function J' is provided by adding a regularization term represented by formula (11) described above to an evaluation function J, and estimation values of R, t, L, and K are obtained by using such an evaluation function J' and an operation similar to that described above. Here, it is also possible for a regularization term of a rotation matrix R to be "$(\theta x-\theta 0x)^2 + (\theta y-\theta 0y)^2 + (\theta z-\theta 0z)^2$" by using preliminary values $\theta 0x$, $\theta 0y$, and $\theta 0z$ of $\theta x$, $\theta y$, and $\theta z$, instead of "$\|R-R0\|^2$".

A case where optical systems of two optical devices (the projection device 200 and the imaging device 300) are both pinhole optical systems has been described above, and then, an operation to be executed by the parameter estimation part 18 will be described in a case where an optical system of one of two optical devices (the imaging device 300 and the projection device 200) is a pinhole optical system and an optical system of the other is a non-pinhole optical system.

<Case where an Optical System of One of Two Optical Devices is a Pinhole Optical System and an Optical System of the Other is a Non-Pinhole Optical System>

Herein, a case will be described where an optical system of the imaging device 300 is a pinhole optical system and an optical system of the projection device 200 is a non-pinhole optical system. In a case where an optical system of the projection device 200 is a non-pinhole optical system, the projection device 200 is provided with a light ray model in such a manner that an equation of a projection light ray is assigned to each pixel on a projection image plane.

Herein, a projection light ray is modeled as a group of an equation of a straight line that is represented by a directional vector $e_p$ of a projection light ray in a projection coordinate system and a passage position $p_p$ of such a projection light ray. For example, it is possible to construct a light ray model in the present embodiment as a look-up table wherein a pixel position (x,y) on a projection image plane corresponds to a directional vector $e_p$ and a passage position $p_p$, and it is also possible to be expressed as a two-variable polynomial wherein a pixel position (x,y) on a projection image plane is a variable.

While presence of a light ray model as described above is supposed, an evaluation function to be used in the parameter estimation part 18 in a case where the projection device 200 is a non-pinhole optical system will be described along with a derivation process thereof.

Figure 8:
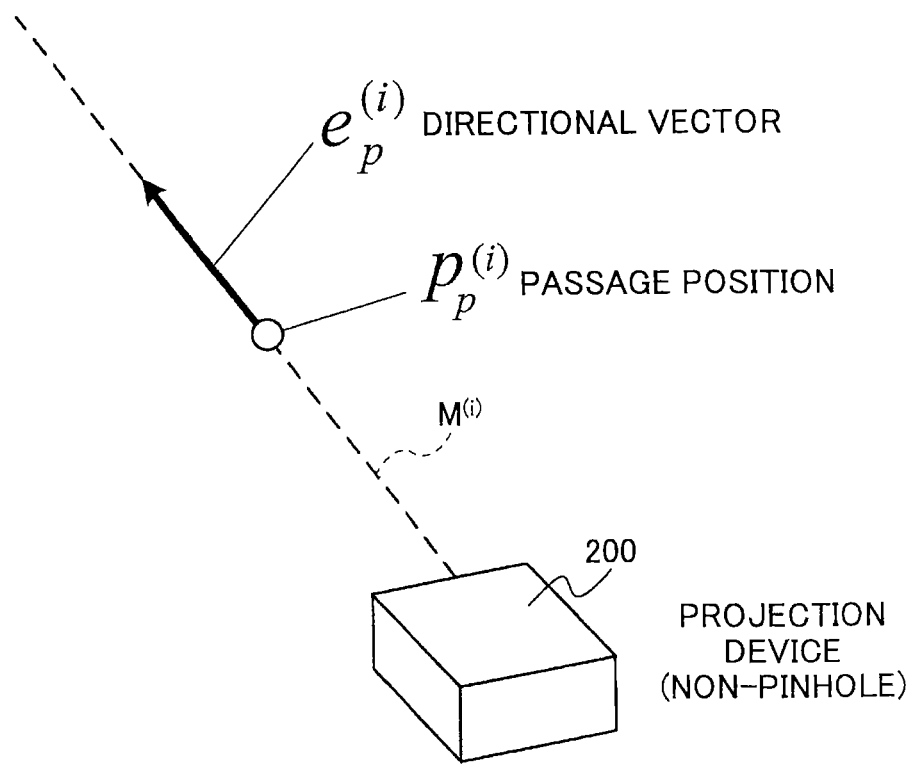
FIG. 8 is a conceptual diagram for illustrating an evaluation function in the present embodiment.
Figure 8:
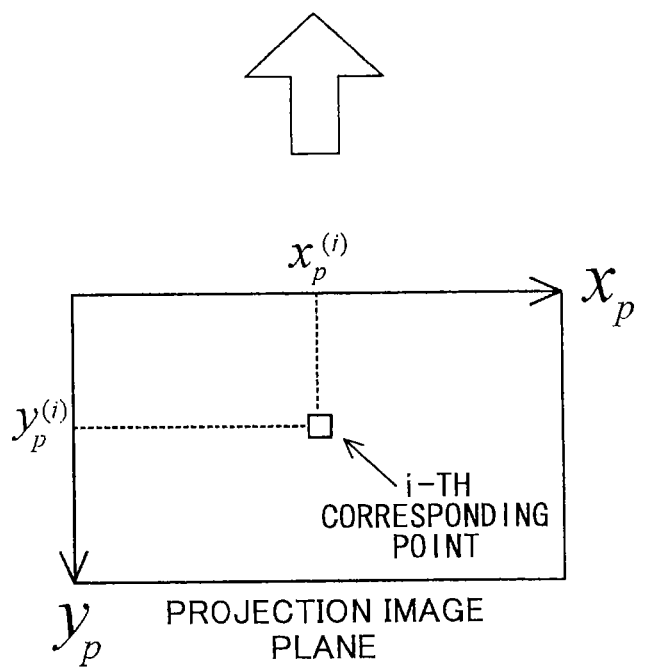

In a case where coordinates of a position of an i-th correspondence point on a projection image plane that corresponds to an i-th characteristic point on an imaging image plane that is extracted at step 103 are referred to as $(x_p^{(i)}, y_p^{(i)})$, a directional vector $e_p^{(i)}$ of a projection light ray $M^{(i)}$ in a projection coordinate system that corresponds to an i-th correspondence point and a passage point $p_p^{(i)}$ of such a projection light ray $M^{(i)}$ are obtained by inputting $(x_p^{(i)}, y_p^{(i)})$ to a light ray model as described above, as illustrated in FIG. 8.

Then, a projection light ray $M^{(i)}$ in an imaging coordinate system is represented by formula (12) described below:

$$Re_p^{(i)}s + Rp_p^{(i)} + t \qquad (12)$$

wherein a rotation matrix R, a translation vector t, and a parameter s are used.

Then, a straight line $N^{(i)}$ provided by projecting a straight line represented by formula (12) described above onto an imaging image plane is represented by formula (13) described below:

$$\{KRe_p^{(i)} \times K(Rp_p^{(i)} + t)\}^T \begin{pmatrix} x_c \\ y_c \\ 1 \end{pmatrix} = 0 \qquad (13)$$

wherein two-dimensional coordinates on an imaging image plane are referred to as $(x_c, y_c)$ and a directional vector $e_p^{(i)}$, a passage position $p_p^{(i)}$, a rotation matrix R, a translation vector t, a internal parameter matrix K of the imaging device 300, and a parameter s are used.

Then, a normal vector of a plane that contains a straight line $N^{(i)}$ is denoted by c(i) similarly to that described previously, formula (14) described below:

$$c^{(i)} = \begin{pmatrix} c_1^{(i)} \\ c_2^{(i)} \\ c_3^{(i)} \end{pmatrix} = \{KRe_p^{(i)} \times K(Rp_p^{(i)} + t)\} \qquad (14)$$

is held.

In this case, a Euclidean square distance $d_i^2$ between coordinates $(x_c^{(i)}, y_c^{(i)})$ of an i-th characteristic point on an imaging image plane and a straight line $N^{(i)}$ on such an imaging image plane is represented by formula (15) described below:

$$d_i^2 = \frac{\left\{c^{(i)T}\begin{pmatrix} x_c^{(i)} \\ y_c^{(i)} \\ 1 \end{pmatrix}\right\}^2}{c_1^{(i)2} + c_2^{(i)2}} \qquad (15)$$

In the present embodiment, a sum of Euclidian square distances $d_i^2$ that are obtained with respect to N characteristic points that are extracted by the characteristic point extraction part 16 is defined as an evaluation function J. Formula (16) described below:

$$J = \sum_{i=1}^{N} d_i^2 \qquad (16)$$

represents an evaluation function J.

Subsequently, a process for estimating a parameter for minimizing an output value of an evaluation function J illustrated in formula (16) described above, in accordance with a non-linear programming method, will be described illustratively.

(Case 1: a Case where R and t are Estimated)

In this case, R and t are estimated by supposing that K is known and L ($e_p$ and $p_p$) is provided by a preliminarily prepared light ray model. Because the present case supposes a non-pinhole property of an optical system of the projection device 200, it is possible to provide a norm (scale) of t as an estimation target (similar in the following case). Therefore, in the present case, values for minimizing an output value of an evaluation function J represented by formula (16) described above are obtained with respect to six variables that are t1, t2, and t3 as free variables of t and rotation angles θx, θy, and θz around x, y, and z axes as free variables of R, in accordance with a non-linear programming method.

(Case 2: a Case where all of R, t, L, and K are Estimated)

Values of K other than a focal length $f_c$ of the imaging device 300 are provided preliminarily, and seven variables that are $f_c$, t1, t2, t3, θx, θy, and θz are provided as estimation targets.

In addition, with respect to L, it is possible to approximate a directional vector $e_p$ and a passage position $p_p$ by polynomials and further provide coefficients thereof as estimation targets, or represent a directional vector $e_p$ and a passage position $p_p$ by a linear sum of a small number of bases and further provide combination coefficients thereof as estimation targets.

Herein, a case will first be described where a directional vector $e_p$ and a passage position $p_p$ are approximated by two-variable polynomials with a position (x,y) of a correspondence point on a projection image plane being provided as a variable. Formula (17) described below:

$$e(x, y) = \begin{pmatrix} a_1^{(0)} \\ a_2^{(0)} \\ a_3^{(0)} \end{pmatrix} + \begin{pmatrix} a_{11}^{(1)} & a_{12}^{(1)} \\ a_{21}^{(1)} & a_{22}^{(1)} \\ a_{31}^{(1)} & a_{32}^{(1)} \end{pmatrix} \begin{pmatrix} x \\ y \end{pmatrix} + \begin{pmatrix} a_{11}^{(2)} & a_{12}^{(2)} & a_{13}^{(2)} \\ a_{21}^{(2)} & a_{22}^{(2)} & a_{23}^{(2)} \\ a_{31}^{(2)} & a_{32}^{(2)} & a_{33}^{(2)} \end{pmatrix} \begin{pmatrix} x^2 \\ xy \\ y^2 \end{pmatrix} + \ldots \qquad (17)$$

and formula (18) described below:

$$p(x, y) = \begin{pmatrix} b_1^{(0)} \\ b_2^{(0)} \\ b_3^{(0)} \end{pmatrix} + \begin{pmatrix} b_{11}^{(1)} & b_{12}^{(1)} \\ b_{21}^{(1)} & b_{22}^{(1)} \\ b_{31}^{(1)} & b_{32}^{(1)} \end{pmatrix} \begin{pmatrix} x \\ y \end{pmatrix} + \begin{pmatrix} b_{11}^{(2)} & b_{12}^{(2)} & b_{13}^{(2)} \\ b_{21}^{(2)} & b_{22}^{(2)} & b_{23}^{(2)} \\ b_{31}^{(2)} & b_{32}^{(2)} & b_{33}^{(2)} \end{pmatrix} \begin{pmatrix} x^2 \\ xy \\ y^2 \end{pmatrix} + \ldots \qquad (18)$$

illustratively represent a polynomial that corresponds to a direction vector $e_p$ and a polynomial that corresponds to a passage position $p_p$, respectively.

In this case, seven variables (fc, t1, t2, t3, θx, θy, θz) described above, coefficients of formula (17) described above (matrices $a^{(0)}$, $a^{(1)}$, and $a^{(2)}$), and coefficients of formula (18) described above (matrices $b^{(0)}$, $b^{(1)}$, and $b^{(2)}$) are provided as estimation targets and estimation values are obtained by a process similar to that of case 1 in accordance with a non-linear programming method.

Then, a case will be described where a directional vector $e_p$ and a passage position $p_p$ are expressed as linear sums of bases wherein a position (x,y) of a correspondence point on a projection image plane is a variable. For example, in a case where the projection device 200 is provided with a zoom mechanism, L ($e_p$ and $p_p$) in each of a time of a minimum zoom and a time of a maximum zoom are obtained preliminarily. Moreover, a directional vector $e_p$ is represented by formula (19) described below:

$$e(x,y)=we_0(x,y)+(1-w)e_1(x,y) \quad (19),$$

on a supposition that a value of a directional vector $e_p$ is linearly changed depending on a zoom.

In formula (19) described above, $e_0(x,y)$ denotes a directional vector of a projection light ray at a time of a minimum zoom, $e_1(x,y)$ denotes a directional vector of a projection light ray at a time of a maximum zoom, and w denotes a weighting factor for a linear sum.

Similarly, a passage position pp is represented by formula (20) described below:

$$p(x,y)=wp_0(x,y)+(1-w)p_1(x,y) \quad (20),$$

on a supposition that a value of a passage position $p_p$ is linearly changed depending on a zoom.

In formula (20) described above, $p_0(x,y)$ denotes a passage position of a projection light ray at a time of a minimum zoom, $p_1(x,y)$ denotes a passage position of a projection light ray at a time of a maximum zoom, and w denotes a weighting factor for a linear sum.

In this case, while seven variables (f, t1, t2, t3, θx, θy, and θz) described above and a weight w shared in formula (19) described above and formula (20) described above are estimation targets, estimation values are obtained by a process similar to that of case 1 in accordance with a non-linear programming method.

Then, a case will be described where an individual variation of a projection device is obtained. In this case, an average value of L ($e_p$ and $p_p$) of a plurality of individuals and a variation vector of each individual are obtained preliminarily. Moreover, a directional vector $e_p$ is represented by formula (21) described below:

$$e(x,y)=e_0(x,y)+we_1(x,y) \quad (21).$$

In formula (21) described above, $e_0(x,y)$ denotes an average value of directional vectors of projection light rays of a plurality of individuals, $e_1(x,y)$ denotes a variation of a directional vector of a projection light ray, and w denotes a weighting factor for a linear sum.

Similarly, it is possible to represent a passage position $p_p$ by formula (22) described below:

$$p(x,y)=p_0(x,y)+wp_1(x,y) \quad (22).$$

In formula (22) described above, $p_0(x,y)$ denotes an average passage position of projection light rays of a plurality of individuals, $p_1(x,y)$ denotes a variation of a passage position, and w denotes a weighting factor for a linear sum.

In this case, while seven variables ($f_c$, t1, t2, t3, θx, θy, and θz) as described above and a weighting factor w shared by formula (21) described above and formula (22) described above are estimation targets, estimation values are obtained by a process similar to that of case 1 in accordance with a non-linear programming method.

Although a case where $e_p$ and $p_p$ for L are approximated by polynomials and coefficients thereof are estimation targets and a case where $e_p$ and $p_p$ are represented by a linear sum of a smaller number of bases and weighting factors thereof are estimation targets have been described, the number of variables are increased in a case where a higher-order polynomial approximation is executed or the number of bases of a linear sum is increased, so that optimization is executed by adding a regularization term to an evaluation function J and adding an amount of a deviation from a preliminary value prepared for each variable to the evaluation function, similarly to that described above.

Although a case where the imaging device 300 is a pinhole optical system and the projection device 200 is a non-pinhole optical system has been described, a process to be executed by the parameter estimation part 18 will next be described in a case where optical systems of two optical devices (the projection device 200 and the imaging device 300) are both non-pinhole optical systems.

<Case where Optical Systems of Two Optical Devices are Both Non-Pinhole Optical Systems>

As having already described above, a group of an equation of a projection light ray that emits from the projection device 200 with a non-pinhole optical system is modeled based on a directional vector $e_p$ in a projection coordinate system of a projection light ray and a passage point $p_p$ of such a projection light ray.

Similarly, a group of an equation of an imaging light ray that is incident on the imaging device 300 with a non-pinhole optical system is modeled based on a directional vector $e_c$ of an imaging light ray in an imaging coordinate system and a passage position $p_c$ of such an imaging light ray.

On a supposition of presence of a light ray model as described above, an evaluation function to be used by the parameter estimation part 18 in a case where optical systems of two optical devices are both non-pinhole optical systems will be described along with a derivation process thereof.

In a case where position coordinates of an i-th correspondence point on a projection image plane that corresponds to an i-th characteristic point on an imaging image plane that is extracted at step 103 are referred to as $(x_p^{(i)}, y_p^{(i)})$, a directional vector $e_p$ of a projection light ray $M^{(i)}$ in a projection coordinate system that corresponds to an i-th correspondence point and a passage position $p_p^{(i)}$ of such a projection light ray $M^{(i)}$ are obtained by inputting $(x_p^{(i)}, y_p^{(i)})$ to a light ray model as described above, as illustrated in FIG. 8.

Then, a projection light ray $M^{(i)}$ in an imaging coordinate system is represented by formula (23) described below:

$$Re_p^{(i)}s+Rp_p^{(i)}+t \quad (23)$$

wherein a directional vector $e_p^{(i)}$, a passage point $p_p^{(i)}$, a rotation matrix R, a translation vector t, and a parameter s are used.

Herein, an image on an imaging image plane that corresponds to a projection light ray $M^{(i)}$ represented by formula (23) described above will be considered. In a case where the imaging device 300 is a pinhole system, it is possible to obtain an image (straight line) on an imaging image plane that corresponds to a projection light ray $M^{(i)}$, by only projective-transforming formula (23) described above, as described previously. However, in a case where the imaging device is a non-pinhole system, it is not possible to obtain a projected image on an imaging image plane that corresponds to a projection light ray $M^{(i)}$, by a projective transformation of formula (23) described above, because a projection light ray $M^{(i)}$ is projected to be a curved line on an imagine image plane.

Figure 9:
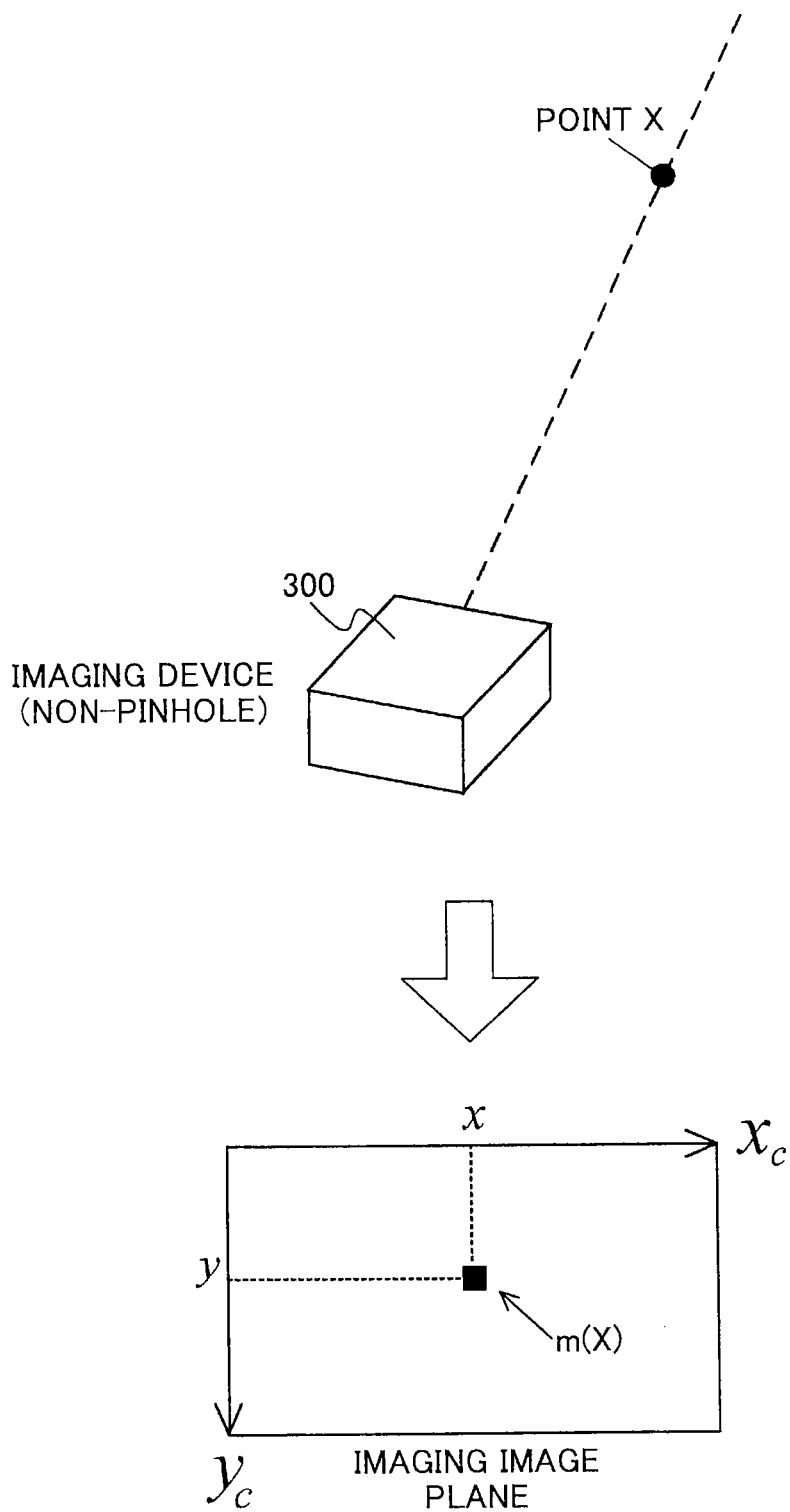
FIG. 9 is a conceptual diagram for illustrating an evaluation function in the present embodiment.

In this respect, a function for deriving an imaging point (two-dimensional coordinates) on an imaging image plane wherein an imaging light ray that passes through an arbitrary point X (three-dimensional vector) on an imaging coordinate system is incident thereon is referred to as m(X) (wherein this function will be described below) in the present embodiment, as illustrated in FIG. 9. In this case, two-dimensional coordinates of a point on a curved line $N^{(i)}$ on an imaging image plane that corresponds to a projection light ray $M^{(i)}$ are represented by formula (24) described below:

$$m(Re_p^{(i)}s + Rp_p^{(i)} + t) \quad (24)$$

Herein, as two-dimensional coordinates of an i-th characteristic point on an imaging image plane that is extracted at step 103 are referred to as $(x_c^{(i)}, y_c^{(i)})$, a Euclidean square distance between a characteristic point $(x_c^{(i)}, y_c^{(i)})$ and an arbitrary point on a curved line N(i) is represented by formula (25) described below:

$$d_i^2(s) = \left\| \begin{pmatrix} x_c^{(i)} \\ y_c^{(i)} \end{pmatrix} - m(Re_p^{(i)}s + Rp_p^{(i)} + t) \right\|^2 \quad (25)$$

wherein a parameter s is used.

Figure 10:
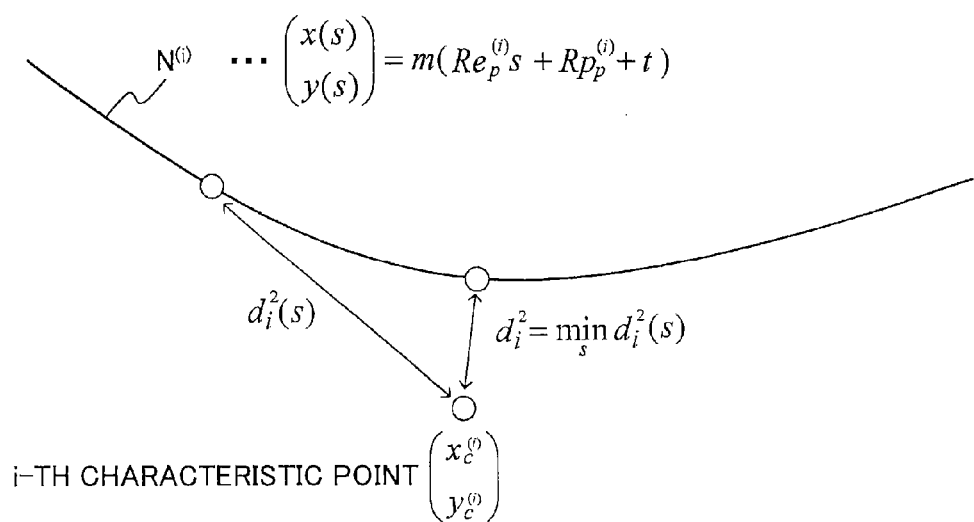
FIG. 10 is a conceptual diagram for illustrating an evaluation function in the present embodiment.

Then, as a Euclidean square distance between a curved line $N^{(i)}$ on an imaging image plane and a characteristic point $(x_c^{(i)}, y_c^{(i)})$ is defined as a minimum value of a Euclidean square distance between a point on a curved line $N^{(i)}$ and a characteristic point $(x_c^{(i)}, y_c^{(i)})$ in the present embodiment, as illustrated in FIG. 10, a Euclidean square distance $d_i^2$ between a curved line $N^{(i)}$ on an imaging image plane and a characteristic point $(x_c^{(i)}, y_c^{(i)})$ is represented by formula (26) described below:

$$d_i^2 = \min_s \left\| \begin{pmatrix} x_c^{(i)} \\ y_c^{(i)} \end{pmatrix} - m(Re_p^{(i)}s + Rp_p^{(i)} + t) \right\|^2 \quad (26)$$

In the present embodiment, a sum of Euclidean square distances $d_i^2$ that are obtained with respect to N characteristic points that are extracted by the characteristic point extraction part 16 is defined as an evaluation function J. Formula (27) described below:

$$J = \sum_{i=1}^{N} d_i^2 \quad (27)$$

represents an evaluation function J.

Then, in the present embodiment, a parameter for minimizing an output value of an evaluation function J illustrated in formula (27) described above is also estimated in accordance with a non-linear programming method. Here, a detail of an operation for parameter estimation is similar to that described above in regard to a case where the projection device 200 is a non-pinhole optical system, and hence, a further description thereof will be omitted.

Herein, in the present embodiment, it is possible to provide a function m(X) for deriving an imaging point (two-dimensional coordinates) on an imaging image plane wherein an imaging light ray that passes through an arbitrary point X (three-dimensional vector) in an imaging coordinate system is imaged thereon, in accordance with a method described below.

(Nearest Neighbor Method)

Figure 11:
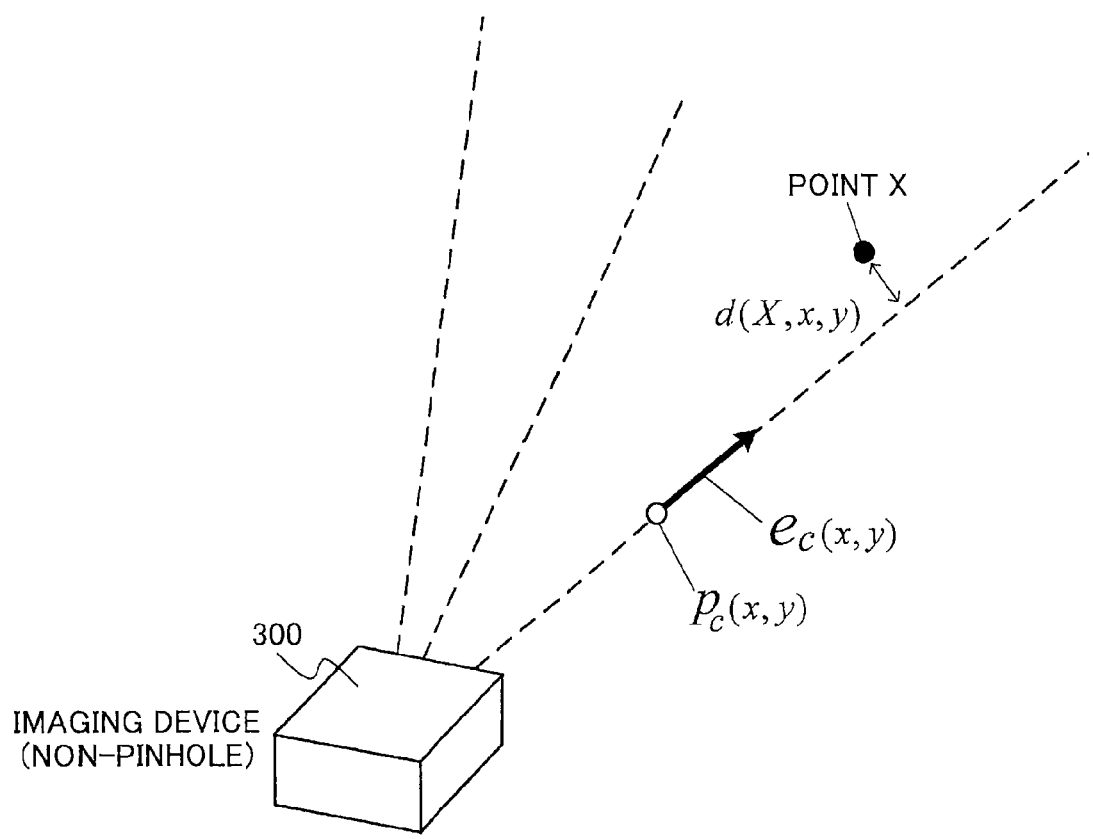
FIG. 11 is a conceptual diagram for illustrating an evaluation function in the present embodiment.

An imaging light ray that is nearest a point X is extracted from a group of equations of imaging light rays for the imaging device 300, and m(X) for outputting two-dimensional coordinates (x,y) on an imaging image plane that correspond to such an imaging light ray is defined. In this respect, a description will be provided based on FIG. 11.

As a directional vector $e_c(x,y)$ of an imaging light ray in an imaging coordinate system that is imaged at a pixel position (x,y) on an imaging image plane and a passage point $p_c(x,y)$ thereof are provided, an Euclidean square distance $d_i^2$ (X,x,y) between a point X and such an imaging light ray is represented by formula (28) described below:

$$d^2(X,x,y) = (X - p_c(x,y))^T (I - e_c(x,y)e_c(x,y)^T)(X - p_c(x,y)) \quad (28)$$

In this case, m(X) is formulated as a function for outputting (x,y) that minimizes this Euclidean square distance $d_i^2(X,x,y)$ as illustrated by formula (29) described below:

$$m(X) \leftarrow \underset{(x,y)}{\operatorname{argmin}} d^2(X, x, y) \quad (29)$$

Herein, for derivation of (x,y) that minimizes $d_i^2(X,x,y)$ in a case where (x,y) is discrete (such as a case where (x, y) is a lattice point), there is provided a (entire search) method that calculates distances for all sets of discrete (x,y) to find a minimum value, as well as, a method for applying a discrete optimization approach with a smaller calculation cost, such as a hill climbing method or a simulated annealing. On the other hand, in a case where (x,y) has continuous values, a gradient of $d_i^2(X,x,y)$ for (x,y) is calculated and a minimization of $d_i^2(X,x,y)$ is executed by a method such as a method of steepest descent or a Newton's method.

(k-Nearest Neighbor Method)

When (x,y) is discrete, precision of a nearest neighbor method as described above is reduced in a case where imaging light rays are not dense in space. Then, k imaging light rays are extracted in order from one nearest a point X, and m(X) is defined that outputs average coordinates of pixel positions on an imaging image plane that correspond to such k imaging light rays. In this case, greater weight may be assigned to an imaging light ray nearer a point X when average coordinates are obtained.

As described above, it is possible to apply a self-calibration method in the present embodiment to a system that has a non-pinhole model optical system. Furthermore, it is possible for a self-calibration method in the present embodiment to provide calibration at high precision because a parameter is estimated in such a manner that a Euclidian distance between a straight line N and a characteristic point is directly minimized while attention is paid to a fact that an error in position extraction of a characteristic point on an imaging image plane is dominant.

Moreover, it is possible for a norm (scale) of t to be an estimation target according to the above-mentioned algorithm prepared for a non-pinhole optical system. Furthermore, because an optical device that completely matches a pinhole model does not actually exist, application of the above-mentioned algorithm prepared for a non-pinhole optical system is also not excluded in a case where both of two optical devices adopt pinhole optical systems, and in that case, it is possible for a norm (scale) of t to be an estimation target.

Although some embodiments of the present invention have been described above, the present invention is not limited to the embodiments described above.

First, in a case where optical systems of two optical devices are both pinhole optical systems, it is also possible to provide, as an evaluation function, a sum of a Euclidean square distance $d_i^2$ between position coordinates $(x_p^{(i)}, y_p^{(i)})$ of an i-th correspondence point on a projection image plane that corresponds to an i-th characteristic point on an imaging image plane and a straight line provided by projecting an imaging light ray that corresponds to such an i-th correspondence point onto a projection image plane, and estimate a parameter for minimizing an output value of such an evaluation function in accordance with a non-linear programming method, instead of an operation as described above.

Second, in a case where optical systems of two optical devices are both non-pinhole optical systems, it is also possible to provide a function m(X) for deriving a correspondence point (two-dimensional coordinates) on a projection image plane that a projection light ray that passes through an arbitrary point X (three-dimensional vector) in a projection coordinate system is emitted therefrom, use such m(X) to obtain a straight line provided by projecting an i-th imaging light ray that corresponds to an i-th characteristic point on an imaging image plane onto a projection image plane, provide, as an evaluation function, a sum of a Euclidean square distance $d_i^2$ between position coordinates $(x_p^{(i)}, y_p^{(i)})$ of an i-th correspondence point on a projection image plane and such a straight line, and estimate a parameter for minimizing an output value of such an evaluation function in accordance with a non-linear programming method, instead of an operation as described above.

That is, according to an embodiment of the present invention, it is possible to execute self-calibration for all of four combinations:

(1) an imaging device and a projection device both being pinhole optical systems;

(2) an imaging device being a pinhole optical system and a projection device being a non-pinhole optical system;

(3) an imaging device being a non-pinhole optical system and a projection device being a pinhole optical system; and (4) an imaging device and a projection device being both non-pinhole optical systems.

Moreover, although an aspect that uses one imaging device and one projection device has been described in the embodiment described above, it is also possible to apply an embodiment of the present invention to a case where two or more imaging devices and two or more projection devices are used.

Herein, a case will be considered where $N_p$ projection devices and $N_c$ imaging devices are used. Herein, while an evaluation function $J_{ij}$ that relates to a combination of an i-th projection device and a j-th imaging device is defined by an operation as described above, and further, such an evaluation function $J_{ij}$ is used to newly define an evaluation function J illustrated by formula (30) described below:

$$J = \sum_{i=1}^{N_p} \sum_{j=1}^{N_c} J_{ij} \tag{30}$$

Then, a parameter for minimizing an output value of an evaluation function J illustrated by formula (30) described above is estimated in accordance with a non-linear programming method.

Moreover, although lens distortions of a projection device and an imaging device have not been referred to in the embodiment described above, it is also possible to estimate parameters that include a lens distortion in accordance with a method similar to that described above, wherein a lens distortion is parameterized by using a radial direction distortion model, a tangential direction distortion model, or the like.

Moreover, although a checker pattern has been illustrated as a pattern for calibration in the embodiment described above, otherwise, it is also possible to use a circular pattern to extract a central point of a circle as a characteristic point or combine and use a plurality of sine-wave-like patterns to identify a position of a characteristic point based on a phase of a sine wave (a phase shift method).

Otherwise, the scope of embodiments that could be expected by a person(s) skilled in the art is included in the scope of an embodiment of the present invention as long as a function and an effect of such an embodiment of the present invention are provided.

Furthermore, it is possible to realize each function of an embodiment as described above by a device-executable program that is described by C, C++, C#, Java (registered trademark), or the like, and it is possible to store in a device-readable recording medium such as a hard disk device, a CD-ROM, an MO, a DVD, a flexible disk, an EEPROM, or an EPROM and distribute, or transmit through a network in a possible format for another device, a program in the present embodiment.

APPENDIX

An Illustrative Embodiment(s) of a Calibration Device, Method and Program

At least one illustrative embodiment of the present invention may relate to at least one of a calibration device, method and program for calibrating a three-dimensional measurement device.

At least one illustrative embodiment of the present invention may be provided while a problem(s) in the above-mentioned conventional technique(s) is/are taken into consideration.

At least one illustrative embodiment of the present invention may aim at providing a novel self-calibration method that may be able to be applied to a system that has a non-pinhole model optical system.

The present inventor(s) actively studied a novel self-calibration method that may be able to be applied to a system that has a non-pinhole model optical system, and as a result, conceived of and arrived at the following configuration(s) of, and achieved, at least one illustrative embodiment of the present invention.

That is, according to at least one illustrative embodiment of the present invention, there may be provided a calibration device that includes a projection means for controlling a projection device to project a pattern for calibration onto an object to be measured, an imaging means for controlling an imaging device to acquire an imaging image of the object to be measured on which the pattern for calibration has been projected, a characteristic point extraction means for extracting a characteristic point of the pattern for calibration projected from the imaging image onto the object to be measured, and a parameter estimation means for estimating a parameter necessary for a three-dimensional measurement based on a plurality of the extracted characteristic points, wherein the parameter estimation means estimates the parameter for minimizing a distance between the characteristic point on an imaging image plane and a line provided by projecting a projection light ray that corresponds to the characteristic point onto the imaging image plane, in accordance with a non-linear programming method.

Illustrative Embodiment (1) is a calibration device that includes a projection means for controlling a projection device to project a pattern for calibration onto an object to be measured, an imaging means for controlling an imaging device to acquire an imaging image of the object to be measured on which the pattern for calibration has been projected, a characteristic point extraction means for extracting a characteristic point of the pattern for calibration projected from the imaging image onto the object to be measured, and a parameter estimation means for estimating a parameter necessary for a three-dimensional measurement based on a plurality of the extracted characteristic points, wherein the parameter estimation means estimates the parameter for minimizing a distance between the characteristic point on an imaging image plane and a line provided by projecting a projection light ray that corresponds to the characteristic point onto the imaging image plane, in accordance with a non-linear programming method.

Illustrative Embodiment (2) is the calibration device as described in Illustrative Embodiment (1), wherein the projection light ray is modeled as a group of an equation of a straight line represented by a directional vector and a position of passage thereof and each of the directional vector and the position of passage thereof is expressed as a polynomial with a variable that is provided with two-dimensional coordinates on a projection image plane, and wherein the parameter estimation means estimates a coefficient for the polynomial as the parameter.

Illustrative Embodiment (3) is the calibration device as described in Illustrative Embodiments (1), wherein the projection light ray is modeled as a group of an equation of a straight line represented by a directional vector and a position of passage thereof and each of the directional vector and the position of passage thereof is expressed as a linear sum of a base with a variable that is provided with two-dimensional coordinates on a projection image plane, and wherein the parameter estimation means estimates a weighting factor for the linear sum as the parameter.

Illustrative Embodiment (4) is the calibration device as described in any one of Illustrative Embodiments (1) to (3), wherein an imaging light ray of the imaging means is modeled as a group of an equation of a straight line represented by a directional vector and a position of passage thereof and each of the directional vector and the position of passage thereof is expressed as a polynomial with a variable that is provided with two-dimensional coordinates on an imaging image plane, and wherein the parameter estimation means estimates a coefficient for the polynomial as the parameter.

Illustrative Embodiment (5) is the calibration device as described in any one of Illustrative Embodiments (1) to (3), wherein an imaging light ray of the imaging means is modeled as a group of an equation of a straight line represented by a directional vector and a position of passage thereof and each of the directional vector and the position of passage thereof is expressed as a linear sum of a base with a variable that is provided with two-dimensional coordinates on an imaging image plane, and wherein the parameter estimation means estimates a weighting factor for the linear sum as the parameter.

Illustrative Embodiment (6) is a method for calibrating a three-dimensional measurement device that includes a projection device and an imaging device, wherein the method includes a step of controlling a projection device to project a pattern for calibration onto an object to be measured, a step of controlling an imaging device to acquire an imaging image of the object to be measured on which the pattern for calibration has been projected, a step of extracting a characteristic point of the pattern for calibration projected from the imaging image onto the object to be measured, and a step of estimating a parameter necessary for a three-dimensional measurement based on a plurality of the extracted characteristic points, wherein the step of estimating a parameter includes a step of estimating the parameter for minimizing a distance between the characteristic point on an imaging image plane and a line provided by projecting a projection light ray that corresponds to the characteristic point onto the imaging image plane, in accordance with a non-linear programming method.

Illustrative Embodiment (7) is the method as described in Illustrative Embodiment (6), wherein the projection light ray is modeled as a group of an equation of a straight line represented by a directional vector and a position of passage thereof and each of the directional vector and the position of passage thereof is expressed as a polynomial with a variable that is provided with two-dimensional coordinates on a projection image plane, and wherein the step of estimating a parameter includes a step of estimating a coefficient for the polynomial as the parameter.

Illustrative Embodiment (8) is the method as described in Illustrative Embodiments (6), wherein the projection light ray is modeled as a group of an equation of a straight line represented by a directional vector and a position of passage thereof and each of the directional vector and the position of passage thereof is expressed as a linear sum of a base with a variable that is provided with two-dimensional coordinates on a projection image plane, and wherein the step of estimating a parameter includes a step of estimating a weighting factor for the linear sum as the parameter.

Illustrative Embodiment (9) is the method as described in any one of Illustrative Embodiments (6) to (8), wherein an imaging light ray of the imaging device is modeled as a group of an equation of a straight line represented by a directional vector and a position of passage thereof and each of the directional vector and the position of passage thereof is expressed as a polynomial with a variable that is provided with two-dimensional coordinates on an imaging image plane, and wherein the step of estimating a parameter includes a step of estimating a coefficient for the polynomial as the parameter.

Illustrative Embodiment (10) is the method as described in any one of Illustrative Embodiments (6) to (8), wherein an imaging light ray of the imaging device is modeled as a group of an equation of a straight line represented by a directional vector and a position of passage thereof and each of the directional vector and the position of passage thereof is expressed as a linear sum of a base with a variable that is provided with two-dimensional coordinates on an imaging image plane, and wherein the step of estimating a parameter includes a step of estimating a weighting factor for the linear sum as the parameter.

Illustrative Embodiment (11) is a computer-executable program for causing a computer to execute each step of the method as described in any one of Illustrative Embodiments (6) to (10).

Illustrative Embodiment (12) is a calibration device that includes a projection means for controlling a projection device to project a pattern for calibration onto an object to be measured, an imaging means for controlling an imaging device to acquire an imaging image of the object to be measured on which the pattern for calibration has been projected, a characteristic point extraction means for extracting a characteristic point of the pattern for calibration projected from the imaging image onto the object to be measured, and a parameter estimation means for estimating a parameter necessary for a three-dimensional measurement based on a plurality of the extracted characteristic points, wherein the parameter estimation means estimates the parameter for minimizing a distance between a correspondence point on a projection image plane that corresponds to the characteristic point on an imaging image plane and a line provided by projecting an imaging light ray that corresponds to the correspondence point onto the projection image plane, in accordance with a non-linear programming method.

Illustrative Embodiment (13) is a method for calibrating a three-dimensional measurement device that includes a projection device and an imaging device, wherein the method includes a step of controlling a projection device to project a pattern for calibration onto an object to be measured, a step of controlling an imaging device to acquire an imaging image of the object to be measured on which the pattern for calibration has been projected, a step of extracting a characteristic point of the pattern for calibration projected from the imaging image onto the object to be measured, and a step of estimating a parameter necessary for a three-dimensional measurement based on a plurality of the extracted characteristic points, wherein the step of estimating a parameter includes a step of estimating the parameter for minimizing a distance between a correspondence point on a projection image plane that corresponds to the characteristic point on an imaging image plane and a line provided by projecting an imaging light ray that corresponds to the correspondence point onto the projection image plane, in accordance with a non-linear programming method.

Illustrative Embodiment (14) is a computer-executable program for causing a computer to execute each step of the method as described in Illustrative Embodiment (13).

As described above, according to at least one illustrative embodiment of the present invention, it may be possible to provide a novel self-calibration method that may be able to be applied to a system that has a non-pinhole model optical system, and a calibration device and a program to which such a method is applied.

Although the illustrative embodiment(s) and specific example(s) of the present invention have been described with reference to the accompanying drawing(s), the present invention is not limited to any of the illustrative embodiment(s) and specific example(s), and the illustrative embodiment(s) and specific example(s) may be altered, modified, or combined without departing from the scope of the present invention.

The present application is based on and claims the benefit of priority to Japanese Patent Application No. 2013-167588 filed on Aug. 12, 2013, the entire content(s) of which is/are herein incorporated by reference.

What is claimed is:

1. A device comprising:
   processor configured to:
      extract, as a characteristic point, a pattern projected on an object from an imaging image obtained by imaging the pattern projected on the object;
      calculate a parameter configured to minimize a distance between the characteristic point on an imaging image plane and a straight line on the imaging image plane obtained by projecting a projection light ray corresponding to the characteristic point onto the imaging image plane; and
      output the parameter to calibrate the device.

2. The device as claimed in claim 1, wherein the parameter is a coefficient for a polynomial configured to represent each of a directional vector and a position of passage of the projection light ray and include a variable with two-dimensional coordinates on a projection image plane.

3. The device as claimed in claim 1, wherein the parameter is a weighting factor for a linear sum of a base configured to represent each of a directional vector and a position of passage of the projection light ray and include a variable with two-dimensional coordinates on a projection image plane.

4. The device as claimed in claim 1, wherein the parameter is a coefficient for a polynomial configured to represent each of a directional vector and a position of passage of an imaging light ray and include a variable with two-dimensional coordinates on a projection image plane.

5. The device as claimed in claim 1, wherein the parameter is a weighting factor for a linear sum of a base configured to represent each of a directional vector and a position of passage of an imaging light ray and include variable with two-dimensional coordinates on a projection image plane.

6. A method comprising:
   extracting, as a characteristic point, a pattern projected on an object from an imaging image obtained by imaging the pattern projected on the object; and
   calculating a parameter configured to minimize a distance between the characteristic point on an imaging image plane and a straight line on the imaging image plane obtained by projecting a projection light ray corresponding to the characteristic point onto the imaging image plane; and
   outputting the parameter to calibrate the device.

7. The method as claimed in claim 6, wherein the parameter is a coefficient for a polynomial configured to represent each of a directional vector and a position of passage of the projection light ray and include a variable with two-dimensional coordinates on a projection image plane.

8. The method as claimed in claim 6, wherein the parameter is a weighting factor for a linear sum of a base configured to represent each of a directional vector and a position of passage of the projection light ray and include a variable with two-dimensional coordinates on a projection image plane.

9. The method as claimed in claim 6, wherein the parameter is a coefficient for a polynomial configured to represent each of a directional vector and a position of passage of an imaging light ray and include variable with two-dimensional coordinates on a projection image plane.

10. The method as claimed in claim 6, wherein the parameter is a weighting factor for a linear sum of a base configured to represent each of a directional vector and a position of passage of an imaging light ray and include a variable with two-dimensional coordinates on a projection image plane.

11. A non-transitory computer-readable recording medium, comprising a program recorded therein, the program being configured to cause a computer to execute a method including:
- extracting, as a characteristic point, a pattern projected on an object from an imaging image obtained by imaging the pattern projected on the object;
- calculating a parameter configured to minimize a distance between the characteristic point on an imaging image plane and a straight line on the imaging image plane obtained by projecting a projection light ray corresponding to the characteristic point onto the imaging image plane; and
- outputting the parameter to calibrate the device.

* * * * *